(12) United States Patent
Kong

(10) Patent No.: US 6,918,941 B2
(45) Date of Patent: Jul. 19, 2005

(54) CERMET MATERIALS, SELF-CLEANING CERMET FILTERS, APPARATUS AND SYSTEMS EMPLOYING SAME

(75) Inventor: Peter C. Kong, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 10/213,120

(22) Filed: Nov. 4, 2002

(65) Prior Publication Data

US 2004/0083691 A1 May 6, 2004

Related U.S. Application Data

(63) Continuation-in-part of application No. 10/213,112, filed on Aug. 5, 2002.

(51) Int. Cl.[7] .......................... B01D 39/20; B01D 46/24
(52) U.S. Cl. ....................... 55/523; 55/282.2; 55/282.3; 55/385.3; 55/524; 55/DIG. 10; 55/DIG. 30; 60/311; 96/108
(58) Field of Search ............................ 55/282.2, 282.3, 55/385.3, 523, 524, DIG. 10, DIG. 30, 529; 60/297, 311; 96/108

(56) References Cited

U.S. PATENT DOCUMENTS

| | | | |
|---|---|---|---|
| 4,018,687 A | * | 4/1977 | Zahour .................... 55/523 |
| 4,909,842 A | | 3/1990 | Dunmead et al. |
| 4,942,020 A | | 7/1990 | Whittenberger et al. |
| 4,990,181 A | | 2/1991 | Pierotti et al. |
| 4,992,233 A | | 2/1991 | Swaroop et al. |
| 5,053,062 A | * | 10/1991 | Barris et al. .............. 60/311 |
| 5,217,816 A | * | 6/1993 | Brupbacher et al. ....... 428/614 |
| 5,496,655 A | | 3/1996 | Lessing |
| 5,545,240 A | * | 8/1996 | Tsuru et al. ............... 55/523 |
| 5,682,740 A | * | 11/1997 | Kawamura ................. 55/523 |
| 5,714,065 A | * | 2/1998 | Huder ...................... 55/523 |
| 5,735,332 A | | 4/1998 | Ritland et al. |
| 5,766,458 A | * | 6/1998 | Sekhar et al. ............. 55/523 |
| 5,774,779 A | | 6/1998 | Tuchinskiy |
| 5,780,811 A | * | 7/1998 | Kawamura ............ 55/DIG. 30 |
| 5,827,424 A | * | 10/1998 | Gillis et al. ............... 55/523 |
| 5,951,791 A | | 9/1999 | Bell et al. |
| 6,025,065 A | * | 2/2000 | Claussen et al. ......... 428/307.7 |
| 6,033,623 A | * | 3/2000 | Deevi et al. ............... 419/45 |
| 6,271,461 B1 | * | 8/2001 | Fraas et al. ............... 136/253 |
| 6,314,722 B1 | * | 11/2001 | Matros et al. .............. 60/297 |
| 6,641,795 B2 | | 11/2003 | Abe |
| 2004/0020176 A1 | | 2/2004 | Kong |

\* cited by examiner

*Primary Examiner*—Duane Smith
*Assistant Examiner*—Jason M. Greene
(74) *Attorney, Agent, or Firm*—Trask Britt, P.C.

(57) ABSTRACT

A self-cleaning porous cermet material, filter and system utilizing the same may be used in filtering particulate and gaseous pollutants from internal combustion engines having intermetallic and ceramic phases. The porous cermet filter may be made from a transition metal aluminide phase and an alumina phase. Filler materials may be added to increase the porosity or tailor the catalytic properties of the cermet material. Additionally, the cermet material may be reinforced with fibers or screens. The porous filter may also be electrically conductive so that a current may be passed therethrough to heat the filter during use. Further, a heating element may be incorporated into the porous cermet filter during manufacture. This heating element can be coated with a ceramic material to electrically insulate the heating element. An external heating element may also be provided to heat the cermet filter during use.

28 Claims, 13 Drawing Sheets

CERMET MATERIALS, SELF-CLEANING CERMET FILTERS, APPARATUS AND SYSTEMS EMPLOYING SAME

CROSS-REFERENCE TO RELATED APPLICATIONS

This application is a continuation-in-part of, and claims benefit under 35 U.S.C. § 120 of, U.S. application Ser. No. 10/213,112, filed Aug. 5, 2002, and entitled METHODS OF FABRICATING CERMET FILTERS AND METHODS OF UTILIZING SAME, pending.

STATEMENT OF GOVERNMENT RIGHTS

The United States Government has certain rights in this invention pursuant to Contract No. DE-AC07-99ID13727, and Contract No. DE-AC07-05ID14517 between the United States Department of Energy and Battelle Energy Alliance, LLC.

BACKGROUND OF THE INVENTION

1. Field of the Invention

This invention relates to cermet filters used to filter combustion products from internal combustion engines. More particularly, this invention relates to a porous, intermetallic-ceramic composite filter that is self-cleaning and can improve emissions from internal combustion engines.

2. State of the Art

Emissions from vehicles, such as heavy-duty diesel engine vehicles, contribute greatly to pollution problems of the United States of America (USA). Heavy-duty vehicle emissions produce ozone, particulate materials (PM), nitrogen oxides ($NO_x$), sulfur oxides ($SO_x$), and volatile organic compounds (VOCs). These emissions can cause adverse health effects such as premature mortality, aggravation of respiratory and cardiovascular disease, chronic bronchitis, changes to lung tissues and structures, and altered respiratory defense mechanisms, among other things. Further, ozone is known to cause crop and forestry losses and PM causes damage to materials and soiling. $NO_x$ and PM also significantly contribute to unsightly smog and substantial visibility impairment in many parts of the USA.

Emissions from diesel engine heavy-duty trucks significantly contribute to these problems throughout the country. By 2007, heavy-duty vehicles will account for 29 percent of $NO_x$ and 14 percent of PM emissions in the USA. These proportions are even higher in some urban areas. For example in Albuquerque, N. Mex., heavy-duty vehicles contribute 37 percent of $NO_x$ and 20 percent of PM emissions.

The United States Environmental Protection Agency (EPA) is proposing a PM emissions standard for new heavy-duty engines of 0.01 grams per brake-horsepower-per hour (g/bhp-hr) to take full effect in 2007. The EPA is also proposing more stringent standards for $NO_x$ and VOC emissions to be phased in between 2007 and 2010. In order to meet these rigorous new standards, new and improved filters are needed.

Engine and catalyst manufacturers have experimented with many catalytic converters and with a wide variety of regenerative catalytic traps. Precious metal catalytic traps are somewhat effective in oxidizing gaseous hydrocarbons and CO as well as the particulate soluble organic fraction (SOF). However, precious metal catalysts are very expensive. Base metal catalytic traps promote soot oxidation but have little effect on $NO_x$, $CO_x$, or $SO_x$.

Intermetallic-ceramic catalyst supports have been produced in the past. For example, U.S. Pat. No. 5,951,791 to Bell et al. discloses using nickel aluminide to coat the inside of an alumina fiber preform. U.S. Pat. No. 5,774,779 to Tuchinskiy and U.S. Pat. No. 4,990,181 to Pierotti et al. disclose using nickel aluminide as a catalyst support. U.S. Pat. No. 4,992,233 to Swaroop et al. discloses using iron aluminide alloys in exhaust filter applications. Also, U.S. Pat. No. 5,496,655 to Lessing discloses using a porous NiAl or $Ni_3Al$ with a ceramic filler to catalyze steam reforming of hydrocarbons to power fuel cells.

Porous ceramic filters made from carbide and oxide materials are well known in the art. However, conventional ceramic filters used with heavy-duty diesel engines have a significant lifetime problem. These ceramic filters have a short lifetime due to severe carbon particulate plugging and structural failure due to high vehicle motion stresses and extreme thermal stresses. Typically, the filters are plugged after 500 hours of service, which makes them a financial and operational liability for companies. Further, the filters often require complicated heating and control systems.

BRIEF SUMMARY OF THE INVENTION

The present invention fulfills the need in the art for a strong and tough porous intermetallic-ceramic composite filter that not only filters particulates but reduces undesirable gaseous pollutants. The present invention eliminates the need for complicated systems to heat the filter and is self-cleaning so it does not plug up with particulate matter. Further, the intermetallic-ceramic composite filters of the present invention do not require coating with other materials for functioning.

The present invention comprises a self-cleaning filter used for filtering particulate and gaseous pollutants from internal combustion engines. The filter is made from a porous cermet-type material having an intermetallic phase and a ceramic phase.

An exemplary embodiment uses a porous cermet filter having a transition metal aluminide phase such as cobalt, iron, nickel, or titanium-type aluminides and an alumina phase.

In another exemplary embodiment, a reinforcement material such as metal fibers, ceramic fibers, or metal screens may be incorporated into the porous cermet filter for added strength.

In another exemplary embodiment, the porous cermet filter is electrically conductive and a current may be passed therethrough to heat it during use.

In another exemplary embodiment, at least one resistive heating element may be incorporated into the porous cermet filter during manufacture. An electrical current may be applied to the resistive heating element to heat the porous cermet filter during use.

In another exemplary embodiment, the resistive heating element has a coefficient of thermal expansion approximately the same as that of the cermet material.

In another exemplary embodiment, the resistive heating element may be coated with a ceramic material prior to incorporation into the cermet filter.

In another exemplary embodiment, the ceramic material coating the resistive heating element electrically insulates it from the cermet material.

In another exemplary embodiment, an external heating element may be provided to heat the porous cermet filter during use.

In another exemplary embodiment, the cermet may be manufactured using a combustion synthesis process by forming a green compact of a transition metal, aluminum, and alumina particles to produce a transition metal aluminide-alumina porous cermet filter. Alternatively, aluminum and thermite particles may be used to produce a nickel aluminide-alumina porous cermet filter.

In another exemplary embodiment, the combustion synthesis process may be performed under a nitrogen-containing atmosphere to form ammonia-producing phases in the porous cermet filter.

In another exemplary embodiment, the combustion synthesis process may be performed with sugar added to the green compact under a nitrogen-containing atmosphere to form ammonia-producing phases in the porous cermet filter.

In another exemplary embodiment, the combustion synthesis process may be performed with an alkali carbonate or an alkali bicarbonate and sugar added to the green compact under a nitrogen-containing atmosphere to form ammonia-producing phases and hydrocarbon gas-producing phases. In this embodiment, an alkali oxide is formed during the combustion synthesis process, which may either be leached out to increase porosity or left in the cermet filter because of its ability to absorb $NO_x$.

In another exemplary embodiment, a sacrificial filler may be added to the green compact to increase the porosity of the cermet filter.

In another exemplary embodiment, a porous cermet filter may be produced with a graded porosity by layering relatively larger and smaller sacrificial filler materials in the green compact.

In another exemplary embodiment, electrodes may be incorporated into the porous cermet filter during the combustion synthesis process.

In another exemplary embodiment, a housing may be bonded to the porous cermet filter during the combustion synthesis process.

The disclosed invention also encompasses methods of manufacture and use of the inventive cermet filter.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1:
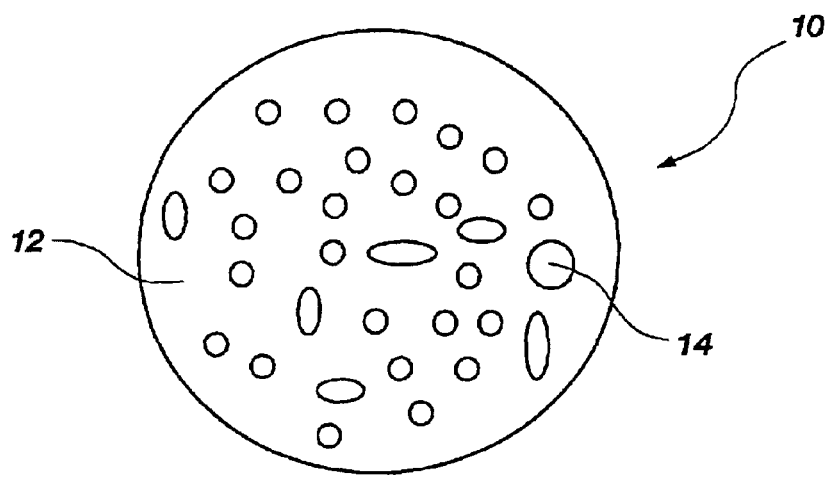
FIG. 1 is sectional view of a porous cermet filter.

Referring to FIG. 1, a sectional view of filter 10 made from cermet 12 and having pores 14 is shown. For purposes of illustration, the sizes of pores 14 in relation to filter 10 are exaggerated. The porous structure of filter 10 is used for its high internal surface area in order to trap particulate matter and for chemical reactions. In an exemplary embodiment, pores 14 are irregular in shape and non-linear. In another exemplary embodiment, filter 10 may be disk or cylinder shaped. Cermet 12 in filter 10 is a metallic-ceramic composite material Cermet 12 or filter 10 may be coating free, in that it lacks a coating of another material deposited over the inside of pores 14.

Figure 2A:
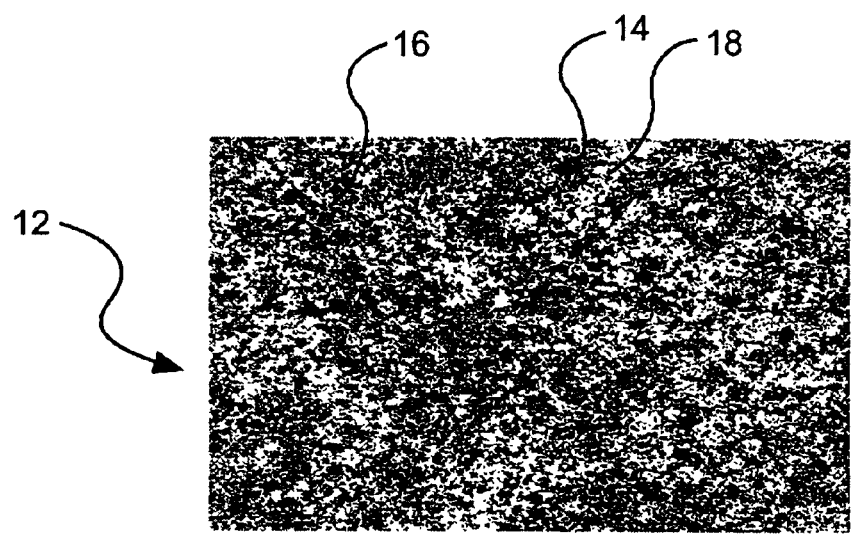
FIGS. 2A and 2B are photomicrographs of the microstructure of the cermet material in FIG. 1.
Figure 2B:
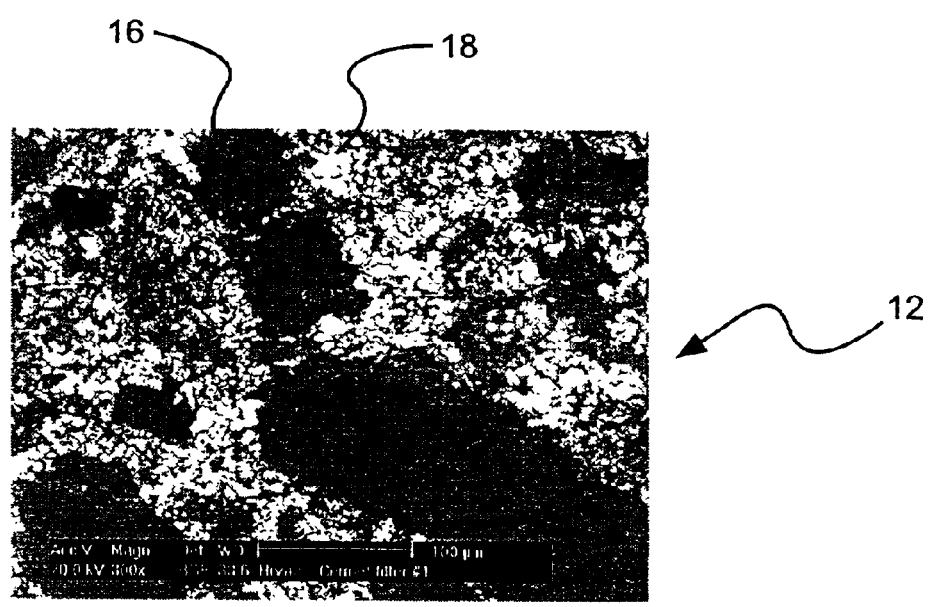

Referring to the photomicrographs of FIGS. 2A and 2B, a representative microstructure of cermet 12 is shown having a ceramic phase 16 and a metallic phase 18. As shown in FIGS. 2A and 2B, ceramic phase 16 may be discontinuous and bonded by metallic phase 18. FIG. 2A shows a 50 wt % NiAl-50 wt % alumina cermet 12 formed from fine alumina particles approximately 5–10 μm in size, nickel particles, and aluminum particles. FIG. 2B shows a 50 wt % NiAl-50 wt % alumina cermet 12 formed from coarse ceramic particles approximately 100–200 μm in size. Various intermetallic compounds may be used for metallic phase 18, such as aluminide compounds of the form AB or $A_3B$. In an exemplary embodiment, the metallic phase 18 is an aluminide such as NiAl, $Ni_3Al$, FeAl, $Fe_3Al$, CoAl, $Co_3Al$, or other transition metal aluminides due to the desirable catalytic properties of transition metals. Transition metals are defined as the elements Sc, Ti, V, Cr, Mn, Fe, Co, Ni, Cu, and Zn. Ceramic phase 16 may be oxide or non-oxide ceramics. Exemplary materials for ceramic phase 16 include alumina ($Al_2O_3$), zirconia silicate ($ZrSiO_4$), zirconia, mullite, cordierite, or iron III oxide ($Fe_2O_3$). In an exemplary embodiment, ceramic phase 16 may be a refractory material, allowing filter 10 to be used at very high temperatures.

Depending on the intended use of filter 10, the composition of cermet 12 may be tailored to affect certain functional characteristics such as incorporating specific catalysts to perform selected catalysis or control of the coefficient of thermal expansion (CTE). An exemplary cermet 12 may exhibit properties such as high melting temperatures (greater than 1500° C.), high fracture toughness (22 MPa·m$^{1/2}$), high strength, high oxidation resistance, controlled porosity (greater than 50%), inexpensive starting materials, an ability to be formed into net shapes, electrically conducting, light weight (less than 3 grams/cm$^3$), high heat capacity, and controllable CTE.

Cermet 12 may be made using conventional powder metallurgy techniques. However, an exemplary manufacturing method mixes metallic and ceramic powders and uses a combustion synthesis process in order to form filter 10 in a single step. In this process, a net shape filter 10 can be produced. In an exemplary embodiment, a mixture is formed of aluminum and transition metal powders mixed together in a 1:1 atomic radio and alumina powder. A small amount of organic binder, such as one weight percent polyvinyl alcohol (PVA), may be used. Upon combustion synthesis, cermet 12 is formed having an alumina ceramic phase 16 and an aluminide metallic phase 18 such as NiAl, CoAl, or FeAl. In another exemplary embodiment, aluminum and transition metal powders such as nickel, cobalt, or iron powders are mixed in a ratio of 1:3 to form an aluminide metallic phase 18 such as Ni$_3$Al, Fe$_3$Al, or Co$_3$Al. In another exemplary embodiment, a sacrificial filler such as polystyrene spheres or fibers may be added to the mixture to increase formation of pores 14. In all cases, the green body is placed in a structurally configured mold and pressed into discs or cylinders to form a green compact.

The green compact is then fired in a furnace between 600° C.–700° C. or higher to set off the combustion synthesis process. At 660° C., the aluminum powder melts. The molten aluminum spreads over the surface of the transition metal particles by capillary action. Molten aluminum reacts with the transition particles in a highly exothermic reaction to form an aluminide compound. The extremely reactive molten aluminum reacts with the transition metal powder and sets off a solid flame. The alumina is not involved in the reaction. The solid flame is an intensely luminous combustion front separating the initial reactant mixture and the solid combustion product. In a pure metallic combustion synthesis process, the combustion front is white-hot and the temperature is extremely high. However, in the exemplary embodiments of the present invention, the presence of ceramic phase 16 made from alumina moderates the combustion process. The combustion process continues until the entire green compact has been reacted to form a net shape cermet 12 with an aluminide metallic phase 18 and an alumina ceramic phase 16. As an example, the chemical reaction involved when nickel is used as the transition metal is shown below.

Aluminum combustion synthesis:

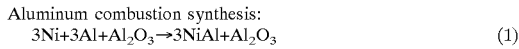

$$3Ni+3Al+Al_2O_3 \rightarrow 3NiAl+Al_2O_3 \quad (1)$$

In another embodiment of the combustion synthesis process, NiAl-alumina cermets may be formed using aluminum particles and thermite (NiO) particles as starting materials. When aluminum reaches the metaling temperature, it is extremely reactive. The molten aluminum reduces NiO to Ni. During this reduction step, the Al reacts with the oxygen to form alumina, and the remaining molten Al combusts with Ni to form NiAl. The energy released by alumina and NiAl formation is tremendous and would raise the overall reaction temperature higher than that from the aluminum combustion synthesis process. Net shape bulk products formed by the aluminum-thermite reaction would thus achieve higher densities because the reaction temperature is significantly higher than the reaction in the previous embodiment. The chemical reaction for the aluminum-thermite reaction is shown below.

Aluminum-thermite combustion synthesis:

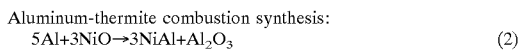

$$5Al+3NiO \rightarrow 3NiAl+Al_2O_3 \quad (2)$$

If a sacrificial filler is added, it is burned off during this process, assisting in leaving pores 14 behind. The sacrificial filler and the volume change due to the formation of aluminide metallic phase 18 all contribute to the formation of pores 14. In an exemplary embodiment, spherical and fiber sacrificial filler materials are used to produce a highly porous cermet 12 with non-linear pore channels. Consolidation pressure affects porosity development of cermet 12. Higher consolidation pressures lead to a denser, less porous material. Also, the size and shape of the ceramic particles used for ceramic phase 16 control the shape and size of pores 14. Larger ceramic particles lead to a large pore size for pores 14. For example, when the ceramic particle size was between 5–10 μm, the average porosity of pores 14 is less than 10 μm. When the ceramic particle size was between 100–200 μm, the average porosity is greater than 50 μm. Exemplary materials for the sacrificial filler are polystyrene particles, Styrofoam® particles, sugar, corn starch, hair, and organic long, thin fibers. Referring to FIG. 3A, a photomicrograph of a cross-section of cermet 12 produced with sugar filler materials is shown. The sizes of pores 14 in FIG. 3A ranged from submicron to 150 μm.

In another exemplary embodiment, hair fibers are frozen in liquid nitrogen and then crushed into short fragments. The hair fibers mix well the metal and ceramic powders and are compacted into the green compact. The green compact is fired under the conditions previously discussed herein. During combustion synthesis, the hair fibers burn out and produce linear or longitudinal pore channels. These type of pores and channels facilitate good gas and fluid transport through the filter and produce a lower pressure drop across filter 10 during use. The photomicrograph in FIG. 3B shows a cross-section of pores 14 produced with a human hair sacrificial filler. FIG. 3C shows a longitudinal section of pores 14 produced with a human hair sacrificial filler. It is currently believed by the inventor that animal hairs will produce similar results. The sacrificial filler materials need not be limited to the examples herein and nay suitable combustible materials may be used in the process as long as they substantially burn off to assist in formation of pores 14.

Figure 3D:
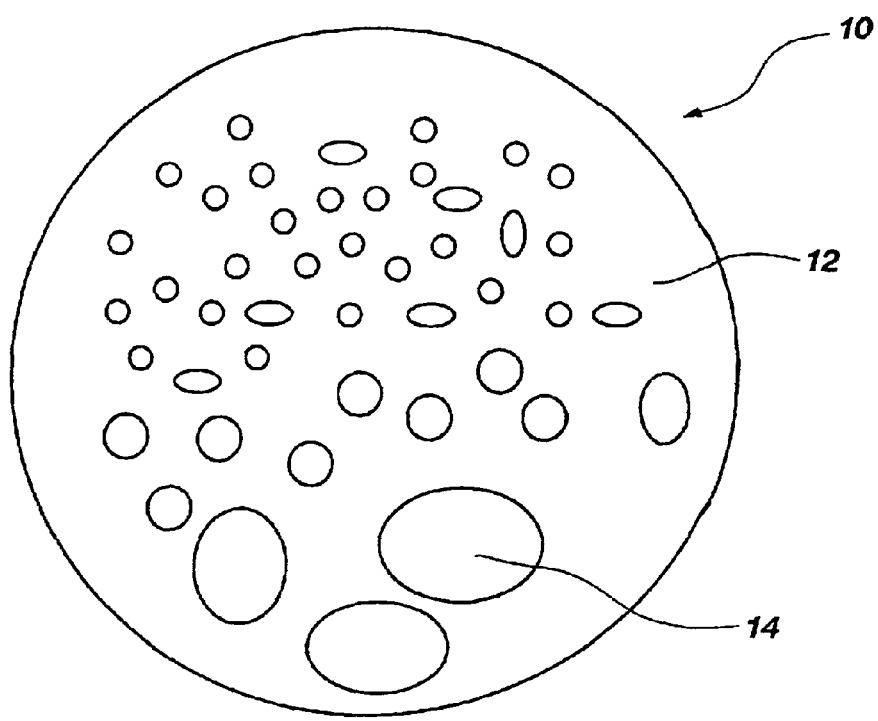
FIG. 3D is a sectional view of a porous cermet filter having a graded porosity.
Figure 3A:
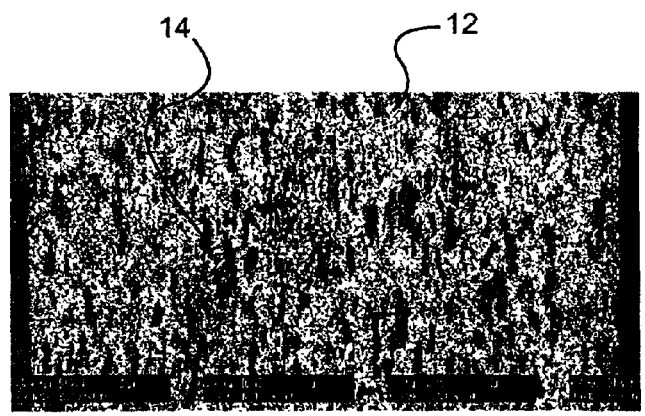
FIG. 3A is a sectional view of a porous cermet filter produced with sugar filler materials.
Figure 3B:
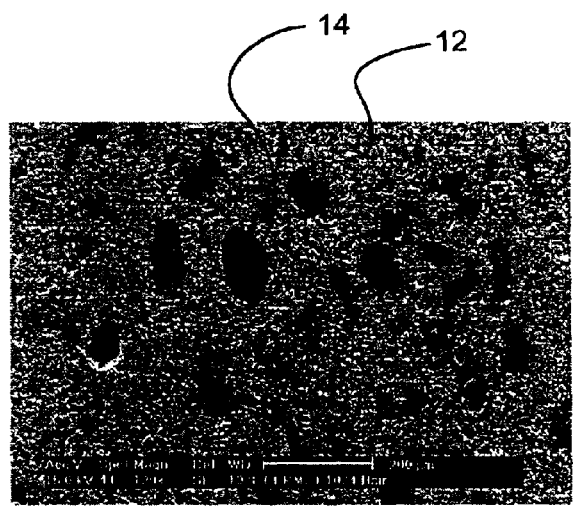
FIG. 3B is a sectional view of a porous cermet filter produced with human hair sacrificial filler materials.
Figure 3C:
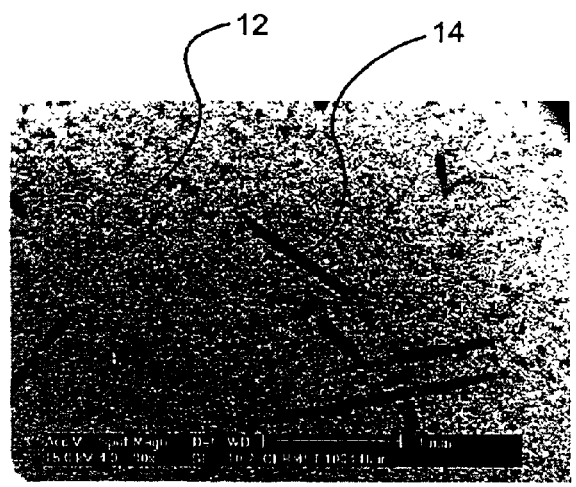
FIG. 3C is a longitudinal view of a porous cermet filter produced with human hair sacrificial filler materials.
Figure 3E:
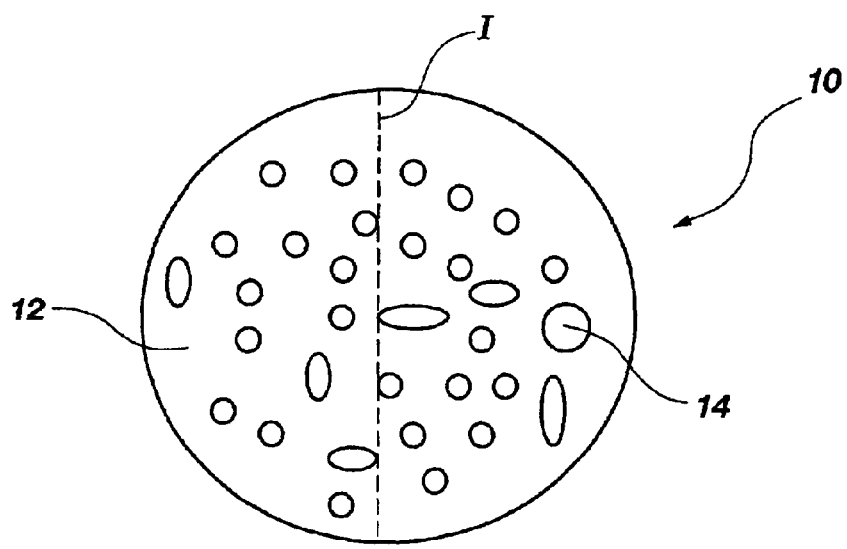
FIGS. 3E and 3F are views of a porous cermet filter having a graded porosity across the length thereof.
Figure 3F:
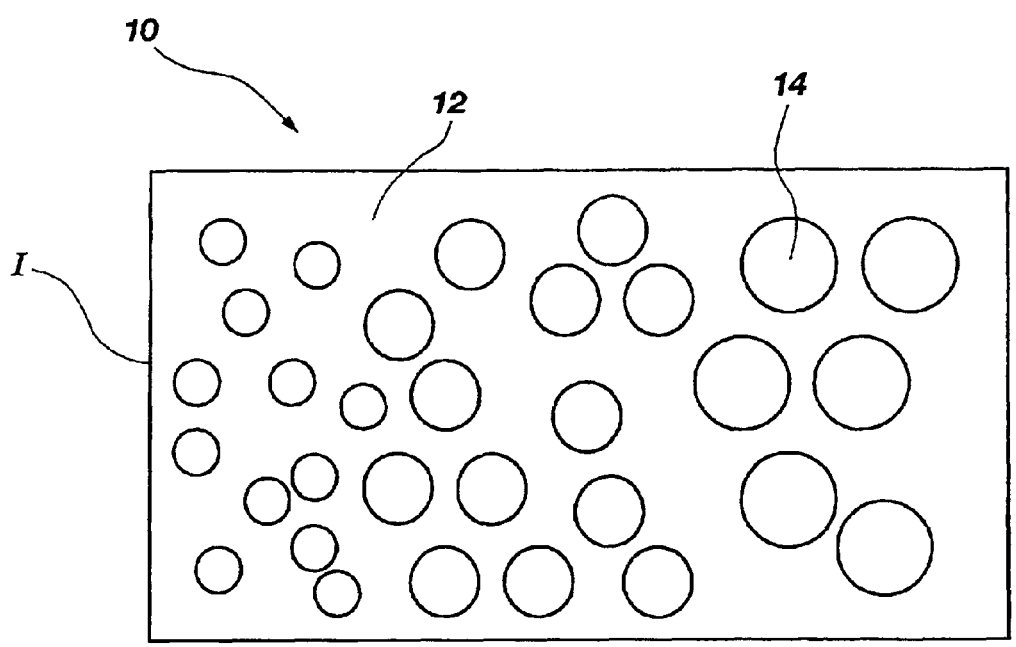

Referring to FIGS. 3D–3F, in another exemplary embodiment, a graded porosity in cermet 12 may be produced during the synthesis process. Relatively smaller sacrificial filler materials produce smaller pores 14 while relatively larger sacrificial filler materials produce larger pores 14. Sequential layering of smaller and larger sacrificial filler materials in the powder mixture in the mold during the consolidation operation produces a graded porous cermet 12. Referring to FIG. 3D, the porosity may be graded in the direction from top to bottom of cermet 12. Referring to FIGS. 3E and 3F, the porosity may be graded across the length of cermet 12. After combustion synthesis, pores 14 of cermet 12 will retain layers of pores reminiscent of the sizes of the initial sacrificial filler materials.

Figure 4A:
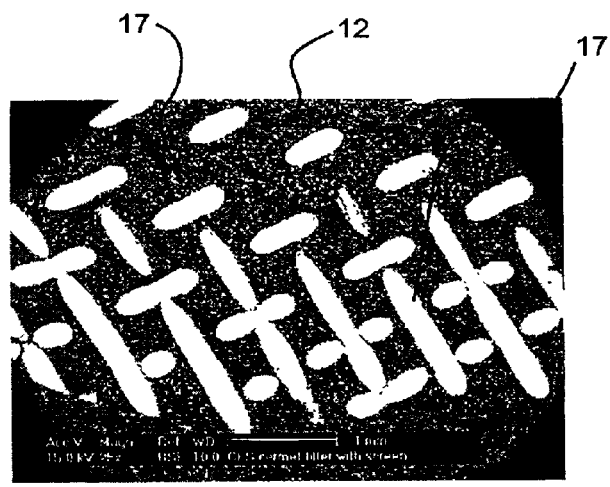
FIG. 4A is a longitudinal view of a porous cermet filter with a reinforcement material.
Figure 4B:
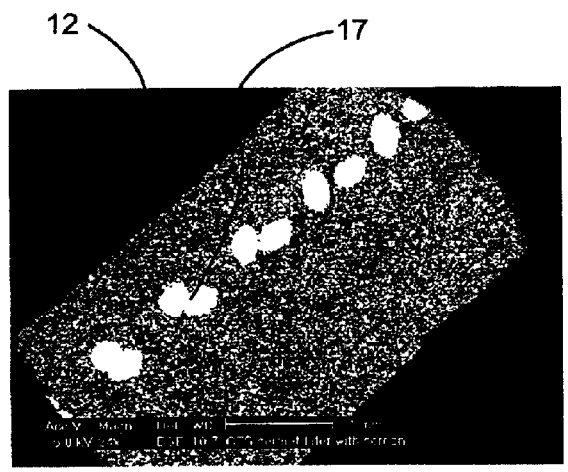
FIG. 4B is a sectional view of a porous cermet filter with a reinforcement material.
Figure 4C:
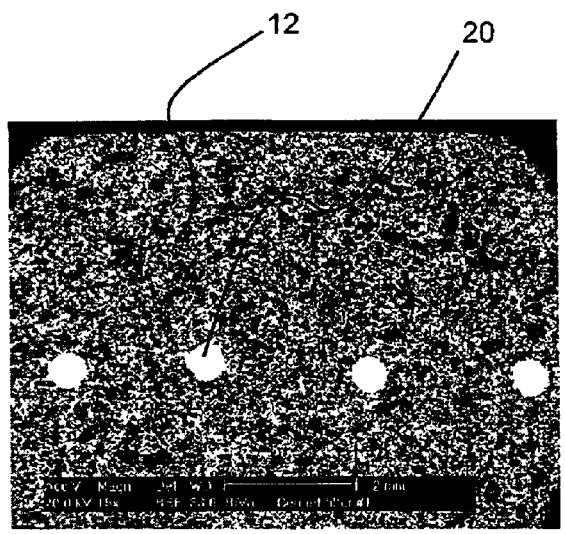
FIG. 4C is a sectional view of a porous cermet filter with multiple resistive heating elements.

Referring to FIGS. 4A–4C, in another exemplary embodiment, reinforcement material 17 can be added to the green compact prior to combustion. FIG. 4A is a longitudinal view of cermet 12 synthesized with a metal reinforcement material 17. FIG. 4B is a sectional view of cermet 12 synthesized with a metal reinforcement material 17. FIG. 4C is a sectional view of cermet 12 reinforced by multiple resistive heating elements 20. Exemplary structures suitable for use as metal reinforcement 17 include long, thin metal fibers or metal screens which are incorporated into the green compact prior to consolidation. Exemplary metals suitable for use as reinforcement material 17 include stainless steels, nickel superalloys, cobalt alloys, titanium alloys, and combinations thereof. In another exemplary embodiment, reinforcement material 17 may be ceramic fibers such as alumina, silicon carbide, or silicon nitride. In an exemplary embodiment, reinforcement material 17 may be fused into cermet 12 during the combustion synthesis process.

Figure 5A:
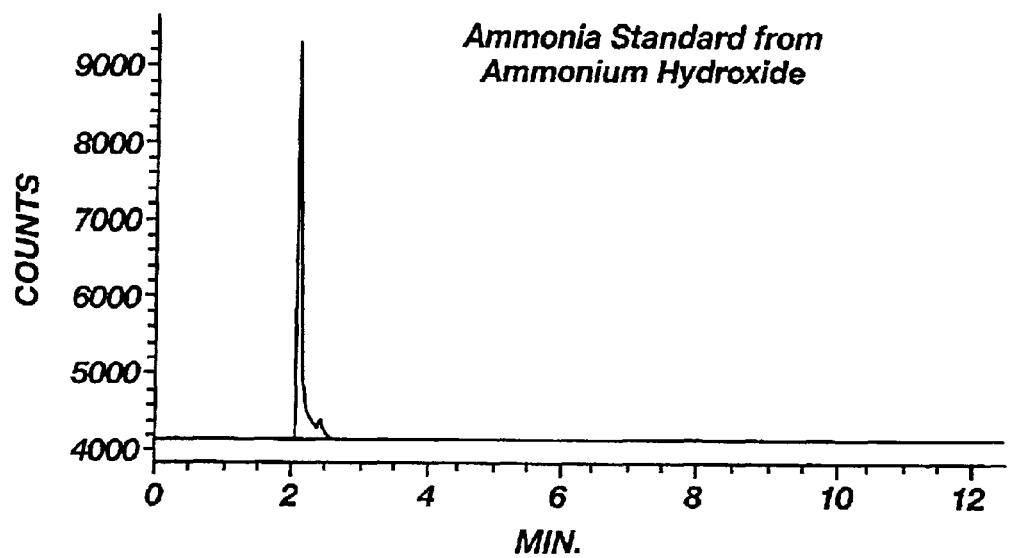
FIGS. 5A and 5B are gas chromatography analyses of an activated cermet filter produced by a combustion synthesis process under a nitrogen atmosphere.
Figure 5B:
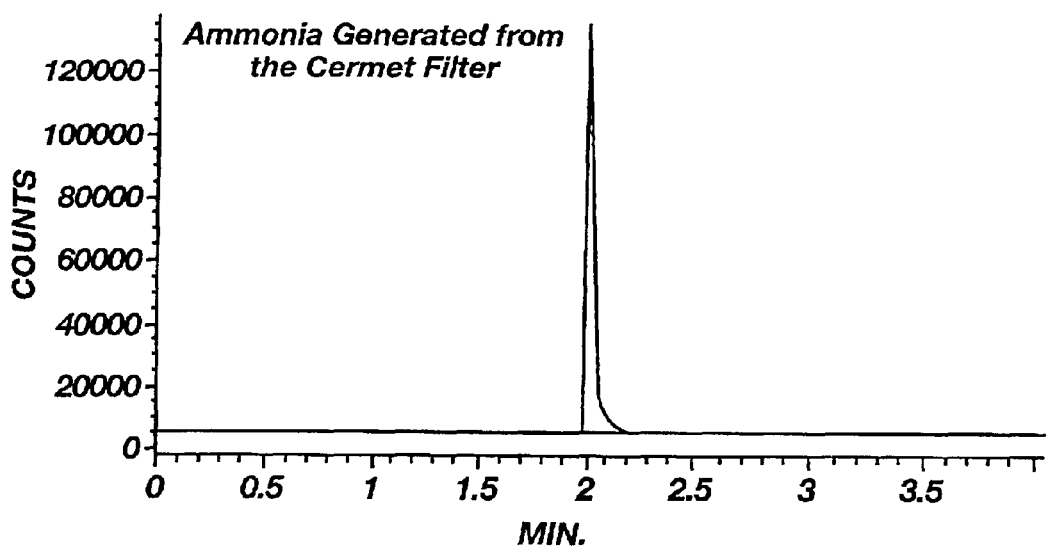

In another exemplary embodiment of the combustion synthesis process, the manufacturing of filter 10 may be performed under a nitrogen atmosphere. Cermet 12 of filter 10 will emit ammonia after activation by water. FIGS. 5A and 5B show the gas chromatography (GC) analysis of the ammonia standard and the ammonia generated from a cermet filter after activation. PH paper tests further confirmed generation of ammonia from cermet 12 by turning dark blue after cermet 12 was activated, indicating the presence of ammonia. During ammonia emission, cermet 12 generates a significant amount of heat. The exothermic reaction indicates formation of new phases in cermet 12 during the combustion synthesis reaction. These new phases are currently believed by the inventor to be nitrogen-containing nitride compounds that will hydrolyze to give off ammonia. It is well known that bulk AlN and $Si_3N_4$ can be synthesized from metal powder compacts by a high pressure nitrogen combustion process. It is currently believed by the inventor that the combustion synthesis processes can form other metal nitrides. These new phases formed in cermet 12 are currently believed by the inventor to be some type of metal nitrides. These nitrides phases produce ammonia when they are activated by water. The ammonia emission phenomenon is also observed with cermet filters synthesized with sacrificial filler materials such as sugar. The general combustion synthesis reactions for ammonia-producing cermet filters are represented by the chemical equations below.

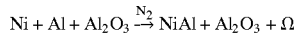

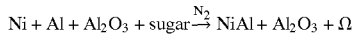

$\Omega$ = ammonia-producing phases

Alternatively, the aluminum-thermite combustion synthesis process may be used instead of the aluminum combustion synthesis process to produce a nickel aluminide-alumina cermet having ammonia-producing phases.

Figure 6A:
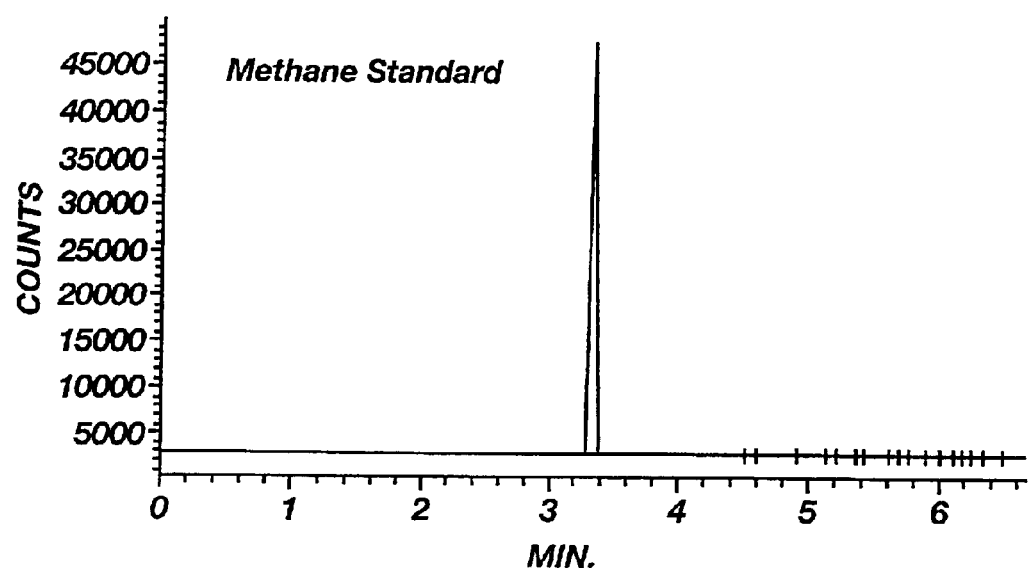
FIGS. 6A and 6B are gas chromatography analyses of an activated cermet filter produced by a combustion synthesis process using a sodium bicarbonate and sugar filler material.
Figure 6B:
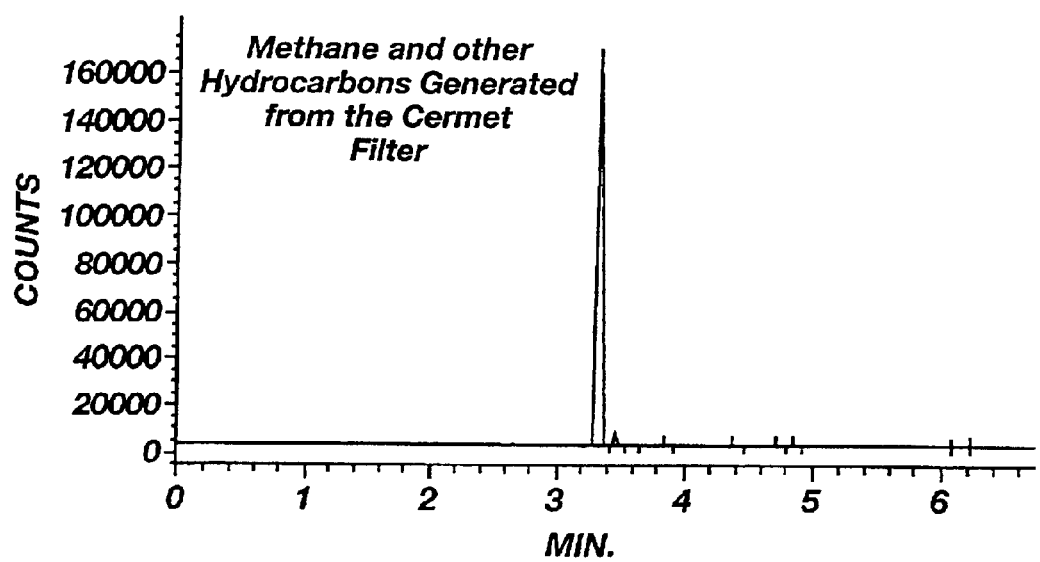

In another exemplary embodiment, mixed filler materials, sodium carbonate ($Na_2CO_3$) or sodium bicarbonate and sugar, are used in the combustion synthesis of cermet 12. Alternatively, any other alkali carbonates or bicarbonates may be used. When the combustion synthesis is carried out under a nitrogen atmosphere, ammonia-producing phases and additional new phases are formed in cermet 12. These additional new phases generate light hydrocarbon gases when cermet 12 is activated by water. The major hydrocarbon gas produced is methane. However, other light hydrocarbon gases have also been detected. FIGS. 6A and 6B show the GC analysis after activation. The primary hydrocarbon produced is methane with minor amounts of other higher hydrocarbons. These new additional phases are currently believed by the inventor to be metal carbides. Particularly, alkaline carbides such as sodium carbide will produce light hydrocarbon gases when hydrolyzed. The compositions of the ammonia—and hydrocarbon gas-producing phases have not been fully identified. This alternative formulation for ammonia—and hydrocarbon gas-producing cermet filters is shown in the following chemical equation.

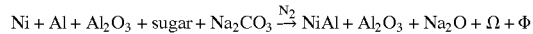

$\Omega$ = ammonia-producing phases $\Phi$ = light hydrocarbon gas producing phases Alternatively, the aluminum-thermite combustion synthesis process may be used instead of the aluminum combustion synthesis process to produce a nickel aluminide-alumina cermet having ammonia-producing phases and hydrocarbon gas-producing phases.

Ammonia and hydrocarbon gases are reducing agents for $NO_x$, which is present in the diesel exhaust gas. The internal generation capability of reducing agents has significant implications for destruction of exhaust $NO_x$. Further, sodium carbonate ($Na_2CO_3$) decomposes to $CO_2$ gas and $Na_2O$ during the combustion synthesis process. If different alkali carbonates or bicarbonates are used of sodium carbonate or bicarbonate, other types of alkali oxides will be formed during synthesis of cermet 12. Further, $CO_2$ escaping from the green compact during the combustion synthesis process produces pores 14 in cermet 12.

In an exemplary embodiment, post combustion synthesis leaching of cermet 12 dissolving the $Na_2O$ particles further increases the porosity of cermet 12. The leaching may be accomplished by soaking cermet 12 in hot or cold water to dissolve the sodium oxide. In another exemplary embodiment, the $Na_2O$ is used to absorb $NO_x$ during use of filter 10.

In an exemplary embodiment, cermet 12 is electrically conductive so that direct internal electrical heating is possible when a current is passed through cermet 12. The temperature of cermet 12 is controlled by the magnitude of the applied current. A larger current will yield a higher temperature for cermet 12. As an example, the battery on a vehicle may be used to provide a DC power source to accomplish this. However, uniform electrical heating depends on good contact and continuity between the portions of metallic phase 18 as well as substantial uniformity throughout cermet 12. The electrical resistance of cermet 12 may be tailored by adding additional metal powders to the green compact. To increase the electrical resistance of cermet 12, metals such as chromium, manganese, silicon, etc. may be added to the powder mixture before combustion.

Figure 7:
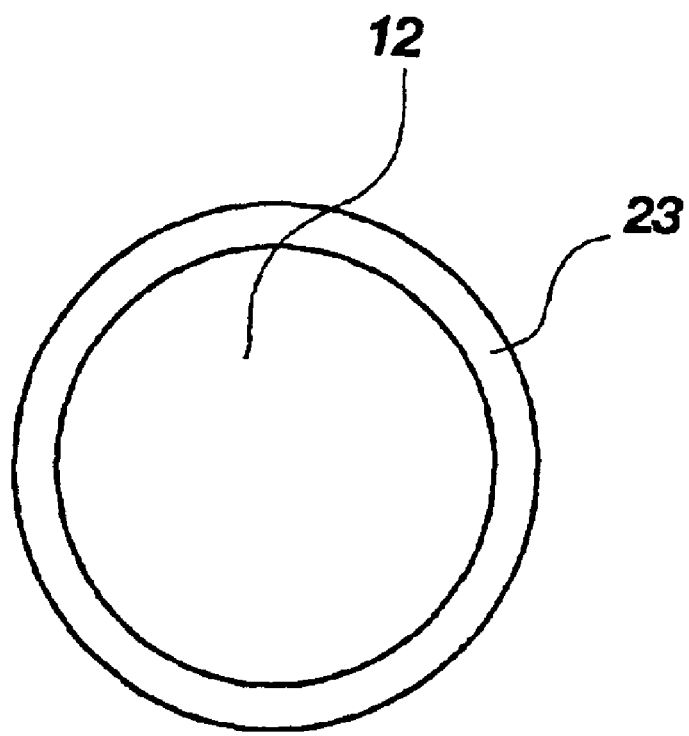
FIG. 7 is a view of electrodes bonded to a cermet filter.

Referring to FIG. 7, in an exemplary embodiment that uses direct internal electrical heating, electrodes 23 are incorporated into cermet 12 during the combustion synthesis process. FIG. 7 shows a thin stainless steel ring electrode 23 that has been bonded to the surface of cermet 12 during combustion synthesis. An Electrical wire may be attached to the electrode to provide direct internal heating. During compaction, the powder mixture is sandwiched between electrodes 23 inside the mold. In an exemplary embodiment, to assist bonding of electrodes 23 to cermet 12, nickel and aluminum fine powders may be coated on the underside of the electrodes using silver paint. However, another metal besides nickel may be used depending on the composition of metallic phase 18. The combustion synthesis process will result in permanent bonding of electrodes 23 to cermet 12 in one single operation.

Figure 8A:
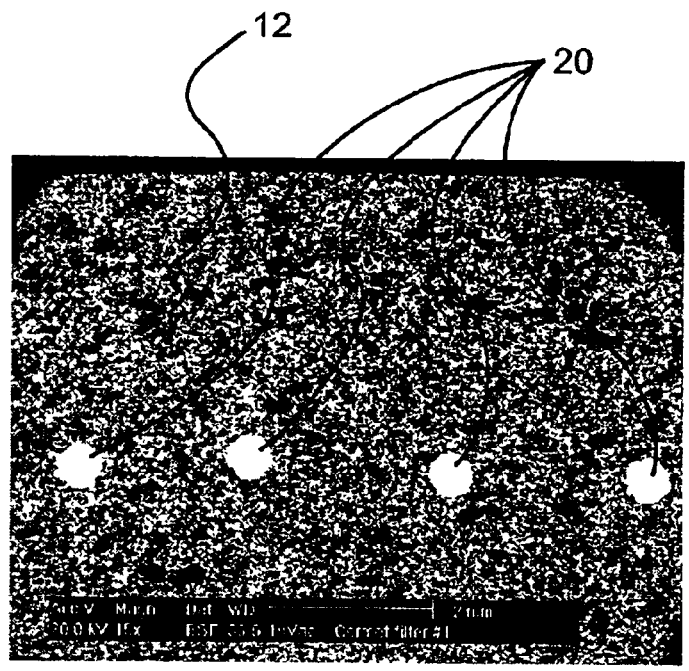
FIG. 8A is a sectional view of a cermet filter having multiple resistive heating elements.
Figure 8B:
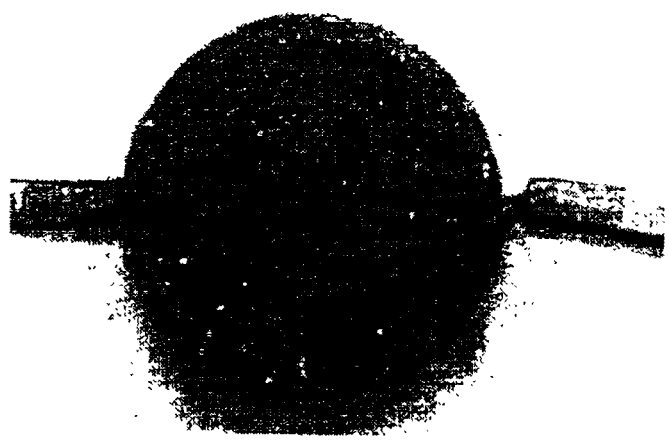
FIG. 8B is a view of the cermet filter of FIG. 9A.
Figure 8C:
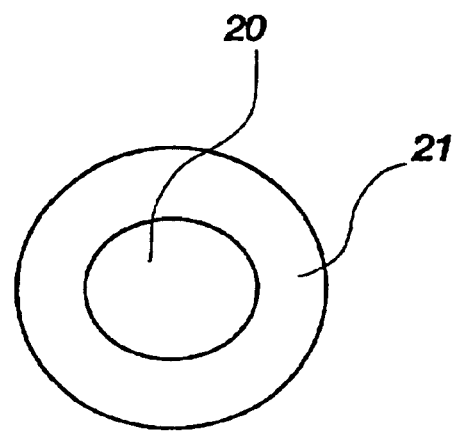
FIG. 8C is a sectional view of a resistive heating element coated with a ceramic material.

Referring to FIGS. 8A–8C, another exemplary embodiment uses internal resistive heating element 20 incorporated in cermet 12. FIG. 8A shows a cross-sectional view of cermet 12 containing multiple resistive heating elements 20. FIG. 8B shows a frontal view of cermet 12. Resistive heating element 20 may be made from nickel-chromium alloys (nichrome), nickel-chromium-iron alloys, molybdenum disilicide ($MoSi_2$), or any other appropriate heating element material known to one of ordinary skill in the art. In another exemplary embodiment, the coefficient of thermal expansion of resistive heating element 20 may be selected to be substantially the same as cermet 12.

Figure 9:
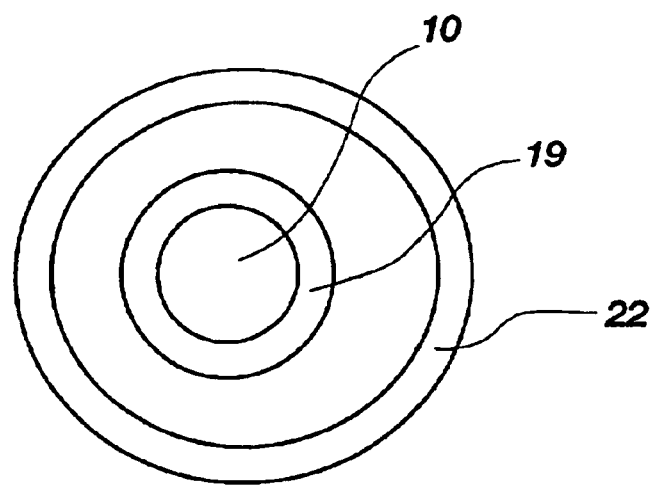
FIG. 9 is a sectional view of a cermet filter with an external heating element.

During combustion synthesis, resistive heating element 20 will be permanently bonded inside filter 10. Referring to FIG. 8C, in another exemplary embodiment, resistive heating element 20 may be coated with ceramic material 21 prior to incorporating it inside filter 10. Examples of such ceramic materials 21 are refractory oxides such as zirconium dioxide ($ZrO_2$), alumina, magnesium oxide (MgO), silicon dioxide ($SiO_2$), or titanium dioxide ($TiO_2$). These types of ceramic materials are well known to one of ordinary skill in the art. The ceramic material 21 may be used to electrically insulate resistive heating element 20 to prevent stray currents from passing through cermet 12. In another exemplary embodiment, resistive heating element 20 structurally strengthens cermet 12. Referring to FIG. 9, in another exemplary embodiment, filter 10 may be electrically insulated with insulation 19. An external heating source 22 may generally surround filter 10 and insulation 19 to heat filter 10. External heating source 22 may be a source such as a resistance heating coil. Other types of external heating sources will be known to one of ordinary skill in the art.

Figure 10A:
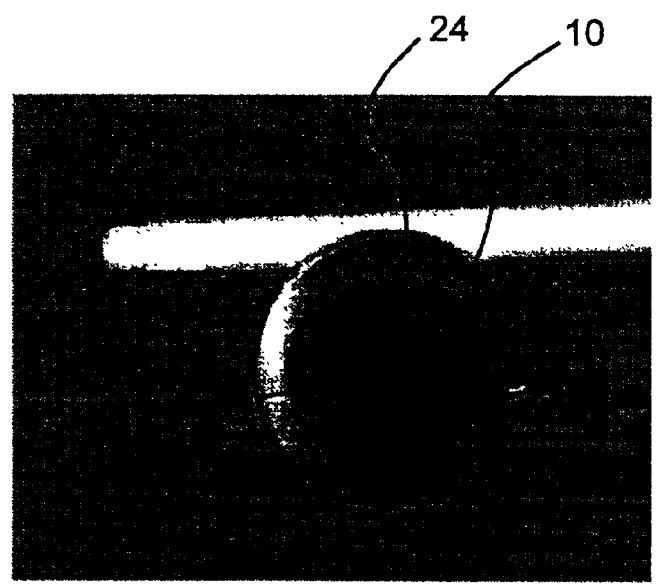
FIGS. 10A and 10B are sectional views of a cermet filter bonded to a filter housing.
Figure 10B:
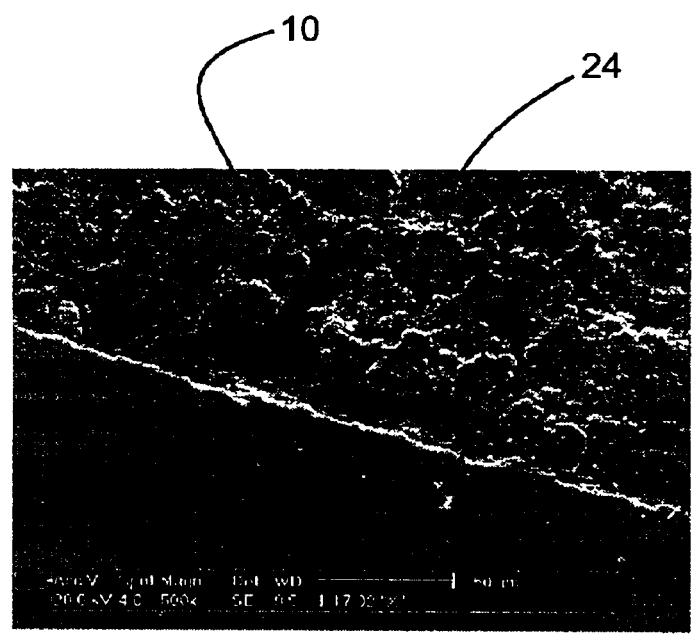

Referring to FIGS. 10A–10B, in another exemplary embodiment, filter housing 24 is reaction bonded to cermet 12 of filter 10 during the combustion synthesis process. Exemplary materials for filter housing 24 include stainless steels, nickel superalloys, and cobalt alloys. Other materials will be known to one of ordinary skill in the art. Prior to compaction of the metal and ceramic powders of cermet 12, the interior of filter housing 24 is coated with a thin layer of aluminum and nickel powder. Another metal besides nickel may be used depending on the composition of metallic phase 18. For instance, iron would be suitable if the metallic phase 18 is an iron aluminide. The green cermet powder is then compacted in filter housing 24 with the thin layer of aluminum and nickel powder in place. During combustion synthesis, the aluminum and nickel powder also combusts. The combustion heat from the process in-situ bonds filter 10 permanently to the wall of filter housing 24. FIG. 10B shows good bonding between cermet 12 of filter 10 and filter housing 24. This exemplary embodiment provides a single-step process to form and bond the cermet 12 of filter 10 to filter housing 24.

Figure 11A:
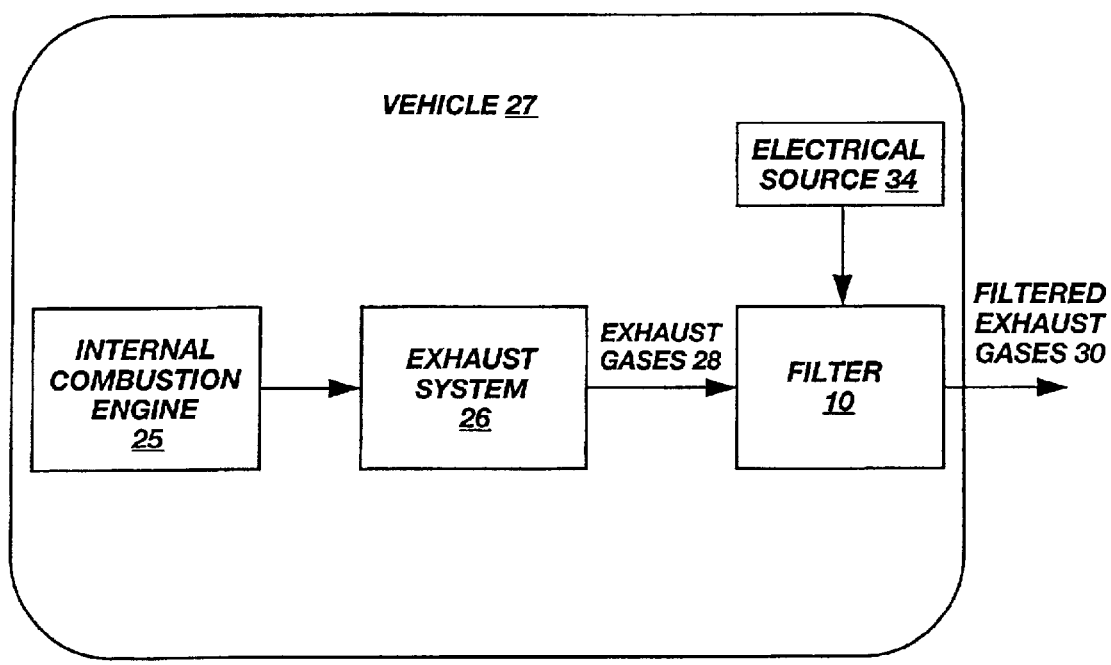
FIGS. 11A and 11B are flow diagrams showing a porous cermet filter coupled to an exhaust system of an internal combustion engine from a vehicle.

Referring to FIG. 11A, filter 10 is coupled to exhaust system 26 of internal combustion engine 25 on a vehicle 27, such as a heavy-duty diesel engine truck. Carbon particles present in exhaust gases 28 will be trapped by pores 14 (not shown) of filter 10. Filtered exhaust gases 30 then exit filter 10 containing substantially less pollutants. During engine operation, filter 10 may heat up periodically or maintain continuous heating to burn off collected carbon particles and keep pores 14 open. For instance, electrical source 34 on vehicle 27 may be used to heat filter 10. Further, the burning off of the carbon particles reduces $NO_x$ gases in the final exhaust gas. The carbon particles in the exhaust stream are very fine and have extremely high active surfaces. At elevated temperatures on a condensable surface such as filter 10, the carbon particles can destroy $NO_x$ and lower the $NO_x$ level in the final exhaust gas. Further, under an oxidizing environment, cermet 12 can destroy CO, $H_2$, and other hydrocarbon gases. Since intermetallic and oxide compositions have a profound influence on pollutant destruction, the catalytic properties of cermet 12 and the operating environment can be tailored to oxidize CO and hydrocarbons while also destroying $NO_x$. The process by which the $NO_x$ gases and carbon particles are destroyed is represented by the following chemical equations:

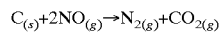

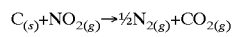

Figure 11B:
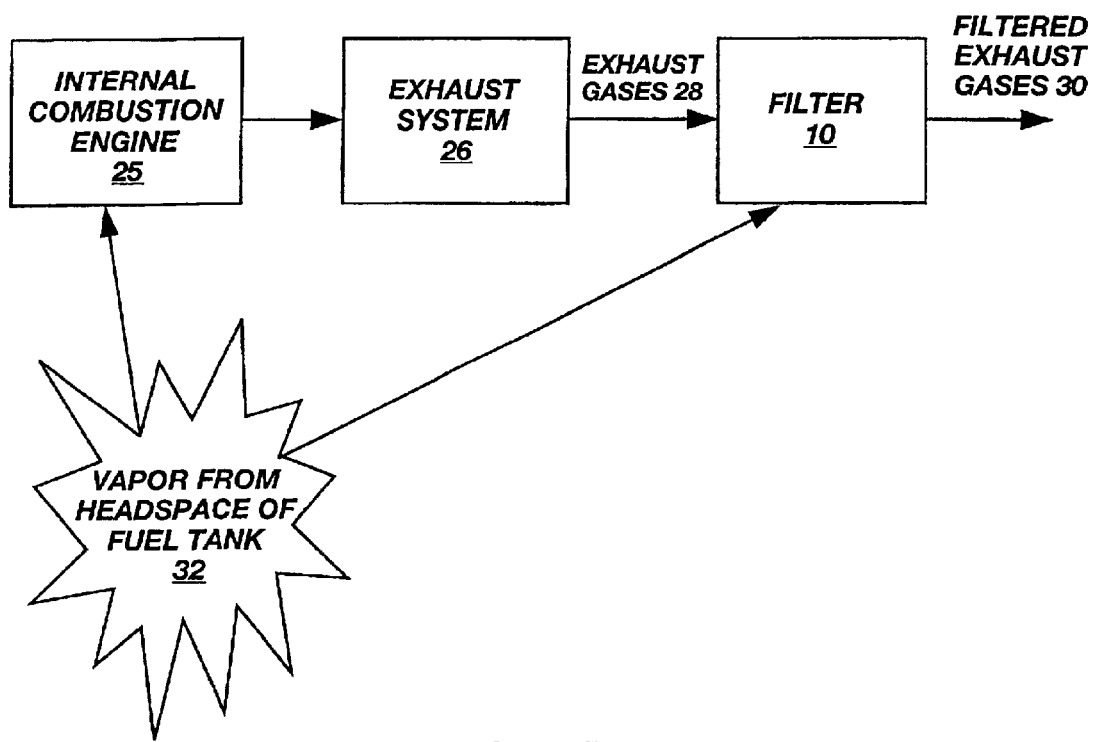

In an exemplary embodiment, pores 14 are of sufficient concentration so that the pressure drop is less than 5 psi across filter 10. Under a fuel lean condition, non-transient steady state driving conditions, the amount of carbon particulate generated from a diesel engine may not be enough to reduce all the $NO_x$ present. Thus, referring to FIG. 11B, in another exemplary embodiment using diesel fuel, vapor from the headspace of the fuel tank 32 can be injected into filter 10 for supplemental $NO_x$ reduction.

The tables below include data from tests of various intermetallic and intermetallic-oxide cermets used for filter 10. The data in the following tables is merely illustrative and other variations on the compositions of the cermets used are fully embraced by the present invention. Tables 1–6 show the test results for several filter compositions. Table 1 shows nitric oxide (NO) conversion to nitrogen for two cermet filters and a molybdenum disilicide filter under a reducing atmosphere. Table 2 shows the percent products of incomplete combustion (PICs) destroyed as a function of temperature for a specific cermet composition. Tables 3–7 show the results of catalytic stream reforming of various hydrocarbon fuels to synthesis gas (CO and $H_2$) by a 50 wt % NiAl-50 wt % alumina cermet filter. Tables 8–9 show pressure drop data with and without the presence of filtered carbon particles in a 50 wt % NiAl-50 wt % alumina cermet filter having approximately 30% porosity.

Table 10 shows test data that simulated the removal of exhaust gas-entrained fine carbon particles generated from an internal combustion engine such as a diesel engine. The individual carbon grain size was approximately 10 nanometers. Agglomerated particle size was approximately 0.5–1.0 $\mu$m. The carbon particles were generated by the thermal plasma decomposition of methane. An airflow rate of 60 liters/minute under high pressure (56 psi) was used. The test lasted 60 minutes. The porosity of the cermet filter used in the pressure drop tests was approximately 30 percent. Test data shows that for a filter porosity of approximately 30 percent containing approximately 0.448 $in^2$ filter area, the carbon filtration efficiency was 99.86 percent. No clogging of the cermet filter was observed. The weight of the trapped carbon after filtering was measured by tapping the cermet filter to remove all of the carbon particles.

Although the foregoing description of embodiments and test data contains many specifics, these should not be construed as limiting the scope of the present invention, but merely as providing illustrations of some exemplary embodiments. Similarly, other embodiments of the invention may be devised which do not depart from the spirit or scope of the present invention. The scope of the invention is, therefore, indicated and limited only by the appended claims and their legal equivalents, rather than by the foregoing description. All additions, deletions, and modifications to the present invention, as disclosed herein, which fall within the meaning and scope of the claims are embraced thereby.

TABLE 1

$NO_{(g)}$ Reduction for NiAl Cermets and $MoSi_2$ Under a Reducing
Atmosphere Test Condition: 5% NO + 1.67% $C_2H_4$ + 93.33% He

| Temperature (° C.) | % $NO_{(g)}$ Conversion to $N_2$ Under a Reducing Atmosphere | | |
|---|---|---|---|
| | 50 wt % NiAl + 50 wt % $ZrSiO_4$ | 50 wt % NiAl + 50 wt % $Fe_2O_3$ | $MoSi_2$ |
| 300 | 0 | 0 | 0 |
| 400 | 0 | 2.5 | 0 |
| 475 | 0 | 2.6 | 2 |
| 550 | 0 | 4.7 | 2 |
| 623 | 3.8 | 13.3 | 2 |
| 696 | 11.3 | 43.1 | 3 |
| 797 | 38.7 | 98.3 | 7 |
| 904 | | 100 | |

TABLE 2

% Products of Incomplete Combustion Destroyed vs. Temperature
for a Cermet Composition of $(NiAl)_{0.2}/Ni_{0.02}/(ZrSiO_4)_{0.04}$

| Temperature (° C.) | $C_3H_6$ | $CH_4$ | CO |
|---|---|---|---|
| 25 | 0 | 0 | 0 |
| 101 | 0 | 0 | 0 |
| 203 | 2.1 | 0 | 5.3 |
| 302 | 1.4 | 0 | 6.1 |
| 403 | 0 | 0 | 8.9 |
| 478 | 11.3 | 15.9 | 24 |
| 553 | 47.8 | 23.3 | 81.2 |
| 627 | 93.8 | 25.2 | 97.0 |
| 702 | 100 | 36.0 | 100 |
| 797 | 100 | 52 | 100 |

TABLE 3

Steam Reforming of Methanol Using a 50 wt % NiAl-50 wt % $Al_2O_3$
Test Conditions: 10 cc $CH_3OH/H_2O$ = 0.5 mole ratio mixture + 5 cc He

| Temperature (° C.) | $CO_2$ (vol. %) | $H_2$ (vol. %) | CO (vol. %) |
|---|---|---|---|
| 500 | 0.1 | 13.0 | 3.5 |
| 600 | 1.5 | 43.0 | 11.4 |
| 700 | 4.7 | 46.0 | 9.6 |
| 800 | 2.2 | 47.7 | 12.0 |
| 900 | 2.1 | 50.0 | 15.1 |
| 967 | 3.2 | 50.3 | 12.4 |

TABLE 4

Steam Reforming of Unleaded
Gasoline Using a 50 wt % NiAl-50 wt % $Al_2O_3$
Test Conditions: 6.4 cc gasoline + 12.8 cc $H_2O$ 10 cc He

| Temperature (° C.) | $CO_2$ (vol. %) | $H_2$ (vol. %) | CO (vol. %) |
|---|---|---|---|
| 788 | 0.2 | 5.7 | 0.5 |
| 896 | 0.3 | 4.6 | 1.2 |
| 1018 | 0.4 | 5.9 | 0.4 |
| 1034 | 3.7 | 22.1 | 2.2 |
| 1042 | 4.2 | 24.4 | 2.7 |
| 1050 | 3.7 | 20.2 | 1.9 |

TABLE 5

Steam Reforming of a #1
Diesel Fuel Using a 50 wt % NiAl-50 wt % $Al_2O_3$
Test Conditions: 6.4 cc Diesel Fuel + 12.8 cc $H_2O$ 10 cc He

| Temperature (° C.) | $CO_2$ (vol. %) | $H_2$ (vol. %) | CO (vol. %) |
|---|---|---|---|
| 902 | 0.3 | 3.2 | 3.3 |
| 1000 | 0.3 | 25.2 | 9.4 |

TABLE 6

Steam Reforming of #2 Diesel Fuel Using a
50 wt % NiAl-50 wt % $Al_2O_3$ Cermet Filter

| Temperature (° C.) | % Conversion = {[CO] + [$H_2$]}/ {[CO] + [$H_2$] + Σ [$C_XH_Y$]} |
|---|---|
| 600 | 43.7 |
| 700 | 48.9 |
| 800 | 53.4 |
| 900 | 59.7 |
| 968 | 72.6 |
| 1013 | 94.2 |

TABLE 7

Steam Reforming of Methane Using a
50 wt % NiAl-50 wt % $Al_2O_3$ Cermet Filter
Test Conditions: 5.0 cc $CH_4$ + 12.8 cc $H_2O$ 35 cc He

| Temperature (° C.) | $CO_2$ (vol. %) | $H_2$ (vol. %) | CO (vol. %) |
|---|---|---|---|
| 703 | <0.1 | <0.1 | <0.1 |
| 791 | <0.1 | <0.1 | <0.1 |
| 905 | <0.1 | 1.3 | 0.2 |
| 1005 | <0.1 | 6.5 | 1.4 |

TABLE 8

Pressure Drop Tests without Carbon Particles in a
50 wt % NiAl-50 wt % $Al_2O_3$ Cermet Filter

| Temperature (° C.) | Flow rate (l/m) | Line P (psi) | Upstream (psi) | Downstream P (psig) |
|---|---|---|---|---|
| 24 | 10 | 56 | 7 | 0 |
| 24 | 20 | 56 | 18 | 0 |
| 24 | 30 | 56 | 25 | 0 |
| 24 | 40 | 56 | 32 | 0 |
| 24 | 60 | 56 | 47 | 0 |

TABLE 9

Pressure Drop Tests with Carbon Particles in a
50 wt % NiAl-50 wt % $Al_2O_3$ Cermet Filter with 30% Porosity

| Temperature (° C.) | Flow rate (l/m) | Line P (psi) | Upstream (psi) | Downstream P (psig) |
|---|---|---|---|---|
| 24 | 10 | 56 | 8.5 | 0 |
| 24 | 20 | 56 | 15 | 0 |
| 24 | 30 | 56 | 23 | 0 |
| 24 | 40 | 56 | 30 | 0 |
| 24 | 50 | 56 | 37 | 0 |
| 24 | 60 | 56 | 51.5 | 0 |

TABLE 10

Fine Carbon Particulate Filtration Tests

| | |
|---|---|
| Initial wt of cermet filter = 3.3073 g | Wt of carbon before filtering = 1.3846 g |
| Final wt of cermet filter = 3.3070 g | Wt of carbon after filtering = 1.3826 g |
| No clogging of the filter observed | Carbon filtration efficiency = 99.86% |
| Effective cermet filter area = 0.448 in$^2$. | Filter porosity ~30% |

What is claimed is:

1. A filter comprising:
a structure having a porous cermet material, the cermet material including:
a discontinuous ceramic phase selected from the group consisting of alumina, zirconia silicate, zirconia, mullite, cordierite, and iron III oxide bonded with a transition metal aluminide phase, wherein the ceramic phase comprises at least approximately 50% by weight of the cermet material; and
wherein the filter is configured to be operably coupled to an exhaust of an internal combustion engine.

2. The filter of claim 1, wherein the transition metal aluminide phase exhibits electrical continuity throughout a substantial portion of the filter.

3. The filter of claim 1 further comprising an electrical source for providing a current within the filter.

4. The filter of claim 1 further comprising a resistive heating element disposed within the filter.

5. The filter of claim 4 further comprising an electrical source for providing a current within the resistive heating element.

6. The filter of claim 4, wherein the resistive heating element is made from a material selected from the group consisting of nickel-chromium alloys and molybdenum disilicide.

7. The filter of claim 4, wherein the resistive heating element has a coefficient of thermal expansion substantially the same as that of the filter.

8. The filter of claim 4, wherein the resistive heating element is coated with a ceramic material.

9. The filter of claim 8, wherein the ceramic material comprises a refractory oxide.

10. The filter of claim 1 further comprising a heating element external to the filter.

11. The filter of claim 1, wherein the filter has a melting temperature greater than or equal to about 1500° C.

12. The filter of claim 1, wherein the filter has a fracture toughness greater than or equal to about 22 MPa·m$^{1/2}$.

13. The filter of claim 1, wherein the filter has a density less than or equal to about 3 grams per cm$^3$.

14. The filter of claim 1, wherein the filter comprises pores providing a volume greater than or equal to about 50 volume percent of the filter.

15. The filter of claim 1, wherein the filter is generally disk shaped or cylinder shaped.

16. The filter of claim 1 further comprising a structural reinforcement phase in the porous cermet material.

17. The filter of claim 16, wherein the structural reinforcement phase is selected from the group consisting of metal fibers, ceramic fibers, and metal screens.

18. The filter of claim 1 further comprising a housing bonded to the porous cermet material.

19. The filter of claim 1, wherein the porous cermet material exhibits a graded porosity.

20. The filter of claim 1 further comprising electrodes integral with the porous cermet material.

21. The filter of claim 1, wherein the porous cermet material further comprises an ammonia emitting phase.

22. The filter of claim 1, wherein the porous cermet material further comprises a hydrocarbon emitting phase.

23. The filter of claim 1, wherein the porous cermet material further comprises a NO$_x$ absorbing phase.

24. The filter of claim 1, wherein the porous cermet material further comprises an alkali oxide phase.

25. An internal combustion system comprising:
an internal combustion engine having an exhaust operably coupled to a filter, the filter comprising a porous cermet material including:
a discontinuous ceramic phase selected from the group consisting of alumina, zirconia silicate, zirconia, mullite, cordierite, and iron III oxide bonded with a transition metal aluminide phase, wherein the ceramic phase comprises at least approximately 50% by weight of the cermet material.

26. A reduced pollution vehicle comprising:
a vehicle having an internal combustion engine, the internal combustion engine having an exhaust operably coupled to a filter, the filter comprising a porous cermet material including:
a discontinuous ceramic phase selected from the group consisting of alumina, zirconia silicate, zirconia, mullite, cordierite, and iron III oxide bonded with a transition metal aluminide phase, wherein the ceramic phase comprises at least approximately 50% by weight of the cermet material.

27. A filter comprising:
a structure having a porous cermet material, the cermet material including:
a discontinuous ceramic phase selected from the group consisting of alumina, zirconia silicate, zirconia, mullite, cordierite, and iron III oxide bonded with a transition metal aluminide phase;
an ammonia emitting phase, and
wherein the filter is configured to be operably coupled to an exhaust of an internal combustion engine.

28. A filter comprising:
a structure having a porous cermet material, the cermet material including:
a discontinuous ceramic phase selected from the group consisting of alumina, zirconia silicate, zirconia, mullite, cordierite, and iron III oxide bonded with a transition metal aluminide phase;
a hydrocarbon emitting phase, and
wherein the filter is configured to be operably coupled to an exhaust of an internal combustion engine.

* * * * *